(12) United States Patent
Mow

(10) Patent No.: US 7,627,110 B2
(45) Date of Patent: Dec. 1, 2009

(54) ENHANCED USER FUNCTIONALITY FROM A TELEPHONE DEVICE TO AN IP NETWORK

(76) Inventor: John Beck Mow, 4665 Glen Heather Dr., Frisco, TX (US) 75034

( * ) Notice: Subject to any disclaimer, the term of this patent is extended or adjusted under 35 U.S.C. 154(b) by 792 days.

(21) Appl. No.: 10/907,586

(22) Filed: Apr. 6, 2005

(65) Prior Publication Data
US 2006/0029211 A1 Feb. 9, 2006

Related U.S. Application Data

(60) Provisional application No. 60/590,381, filed on Jul. 23, 2004.

(51) Int. Cl.
*H04M 1/00* (2006.01)
*H04M 3/00* (2006.01)
(52) U.S. Cl. .................... 379/368; 379/433.07
(58) Field of Classification Search ............... 379/368, 379/433.07
See application file for complete search history.

(56) References Cited

U.S. PATENT DOCUMENTS

| | | | | |
|---|---|---|---|---|
| 5,276,729 A | * | 1/1994 | Higuchi et al. ............ | 455/564 |
| 6,043,761 A | | 3/2000 | Burrell, IV ................. | 341/23 |
| 2003/0112277 A1 | * | 6/2003 | Shteyn ..................... | 345/773 |
| 2004/0022376 A1 | | 3/2004 | Jurman et al. ............ | 379/102.01 |
| 2005/0190159 A1 | * | 9/2005 | Skarine .................... | 345/168 |
| 2006/0123354 A1 | * | 6/2006 | Volovitz ................... | 715/780 |

* cited by examiner

*Primary Examiner*—Alexander Jamal

(57) ABSTRACT

This invention encompasses the utilization of all of the 16 DTMF tone signals on telephone devices and their use for additional adjunct feature controls over IP networks that offer a plethora of new options from telephone devices. Calls on the PSTN only require the 0-9 digits to be used to complete a call following the North American Numbering Plan and International Telecommunications Union (ITU) standards. Conventional telephones electronically have the standard electronics for all 16 DTMF tone signals, but only 12 are utilized on conventional telephones by the typical 4 row and 3 column keypad matrix arrangement. In other words, 25% of the 16 DTMF tones are not being utilized in the public telephone networks. This invention lays the claims surrounding a 100% utilization methodology and possible expansion thereof when communicating to an IP network.

2 Claims, 5 Drawing Sheets

Addition of ABCD Keys

Assigned Function Keys

Future
Assigned Function Keys
Re-labeled Alphabet

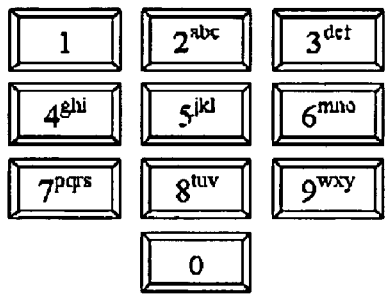
First Touch Tone Keypad
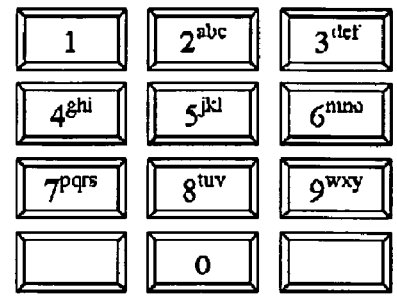
Another Version of Early Keypad
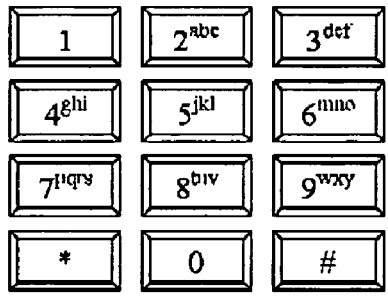
Addition of * and # keys
Figure 1
Prior Art

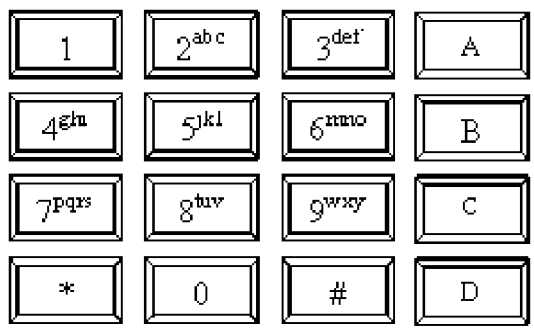
Addition of ABCD Keys
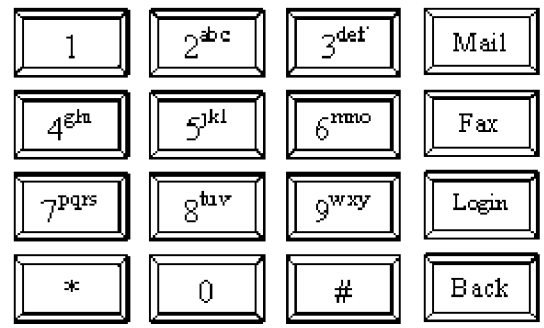
Assigned Function Keys
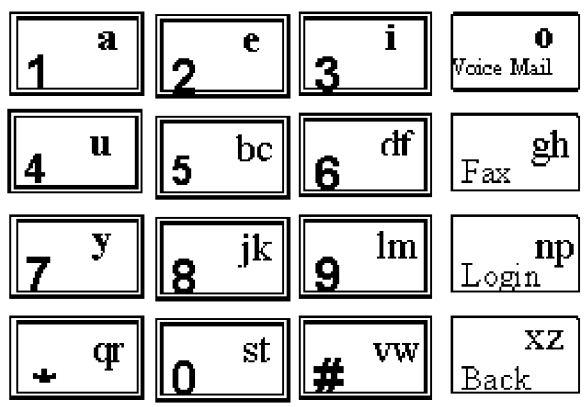
Future
Assigned Function Keys
Re-labeled Alphabet
Figure 2

Future versions of phones with the
4th column DTMF buttons

The 4th Column keys can be used for adjunct feature controls.
The other 12 keys can be used for the standard networks.
The phones then straddle the IP & PSTN networks.

Remote Button Labeling Interaction from an IVR System

ENHANCED USER FUNCTIONALITY FROM A TELEPHONE DEVICE TO AN IP NETWORK

BACKGROUND OF INVENTION

The first use of tone signaling in the PSTN network occurred in 1941 using a 10-12 button keypad. FIG. 1.

In the late 1960's or early 1970's the * and # functions were added for Centrex functions: Call Forwarding, Cancel, etc.— *72, *73 etc. FIG. 1.

With the advent of the microprocessor in the 1970's, many new adjunct systems were added on to the telephone network such as voice mail, least cost routing systems, etc. and the * and # were used more and more.

Each Touch Tone, i.e. DTMF, is comprised of 2 tones, one lower and one higher. There are 2 sets of 4 tones each that are used—

Lower Frequencies 697, 770, 852, 941 hertz

Higher Frequencies 1209, 1336, 1477, 1633 hertz

For instance, the number 1 is represented by the frequencies 697 Hz and 1209 Hz. The following table shows the DTFM frequencies and the corresponding 16 keys.

|    | Key | Frequency #1 | Frequency #2 |
| --- | --- | --- | --- |
| 1  | 1 | 697 Hz | 1209 Hz |
| 2  | 2 | 697 Hz | 1336 Hz |
| 3  | 3 | 697 Hz | 1477 Hz |
| 4  | A | 697 Hz | 1633 Hz |
| 5  | 4 | 770 Hz | 1209 Hz |
| 6  | 5 | 770 Hz | 1336 Hz |
| 7  | 6 | 770 Hz | 1477 Hz |
| 8  | B | 770 Hz | 1633 Hz |
| 9  | 7 | 852 Hz | 1209 Hz |
| 10 | 8 | 852 Hz | 1336 Hz |
| 11 | 9 | 852 Hz | 1477 Hz |
| 12 | C | 852 Hz | 1633 Hz |
| 13 | * | 941 Hz | 1209 Hz |
| 14 | 0 | 941 Hz | 1336 Hz |
| 15 | # | 941 Hz | 1477 Hz |
| 16 | D | 941 Hz | 1633 Hz |

The ABCD keys, referred to as 4th Column DTMF keys, were never introduced in the public domain. FIG. 2. Today, virtually every telephone has an electronic chip that generates these tones, but the PSTN network itself requires only the 0-9 digits to complete a dialed call.

PRIOR ART

In the past 64 years the 4th column DTMF tones have never been utilized in the public telephone network and very few people know they exist. There are hundreds of millions of telephones for public consumption manufactured all over the world—home phones, payphones, business phones and wireless phones—that do not utilize the ABCD tones. In fact there is no provision in the telephone central offices for usage of these tones for public use.

The North American Numbering Plan (NANP) and the International Telecommunications Union (ITU) specifications to complete a telephone call using the PSTN are totally based upon the decimal digits, a carry over from rotary telephone days.

NANP numbers are ten-digit numbers consisting of a three-digit Numbering Plan Area (NPA) code, commonly called an area code, followed by a seven-digit local number. The format is usually represented as NXX-NXX-XXXX where N is any digit from 2 through 9 and X is any digit from 0 through 9.

The twelve sensor touch-tone telephone keypad arrangement and twelve pairs of tones produced by independently depressing any one of the twelve sensors have become the standard throughout the world. Since the advent of the twelve key push-button telephone arrangement, many have tried to produce alphanumeric text and control means using only twelve sensors. In the telephony industry, the twelve sensor (four high/three wide) push-button telephone keypad arrangement with twenty-four letters of the alphabet, excluding the Q and Z, arranged in groups of threes, located on the faces of the sensors numbered two 2 through nine 9 has become the world standard. The actuation of any one of the twelve sensors, produces an analog, dual tone multi-frequency signal (DTMF), which is a combination of two analog voice frequency tones. The telephone system hardware then converts the analog DTMF tones into a digital signal for processing, digital phones being the exception. In the past, the Q and Z have been located on the face of the sensors in a few different locations. The most common way in the past, is where the Q and Z are located on the 1 sensor. Usually the Q and Z are located next to each other above the 1 or the Q on the 7 sensor and the Z on the 9 sensor.

Apparatuses, systems and methods of possible relevance include the following prior arts:

Witten, I. H., Principles of Computer Speech.

U.S. Pat. No. 2,073,333 to Chireix.

U.S. Pat. No. 3,381,276 to James.

U.S. Pat. No. 3,526,892 to Bartlett et al.

U.S. Pat. No. 3,573,376 to Bartlett et al.

U.S. Pat. No. 3,582,554 to LeBlang.

U.S. Pat. No. 3,618,038 to Stein.

U.S. Pat. No. 3,647,973 to James et al.

U.S. Pat. No. 3,675,513 to James Flanagan, et al.

U.S. Pat. No. 3,746,793 to Sachs.

U.S. Pat. No. 3,778,553 to Rackman.

U.S. Pat. No. 3,833,765 to Hillborn et al.

U.S. Pat. No. 3,870,821 to Steury.

U.S. Pat. No. 3,879,722 to Knowlton.

U.S. Pat. No. 3,967,273 to Knowlton.

U.S. Pat. No. 4,012,599 to Jerome Meyer.

U.S. Pat. No. 4,005,388 to Morley et al.

U.S. Pat. No. 4,007,443 to Bromberg et al.

U.S. Pat. No. 4,191,854 to Coles.

U.S. Pat. No. 4,304,968 to Klausner et al.

U.S. Pat. No. 4,307,266 to Messina.

U.S. Pat. No. 4,344,069 to Prame.

U.S. Pat. No. 4,381,502 to Prame.

U.S. Pat. No. 4,426,555 to Underkoffler.

U.S. Pat. No. 4,427,848 to Peter Tsakanikas.

U.S. Pat. No. 4,440,977 to John Pao, et al.

U.S. Pat. No. 4,481,508 to Kamei et al.

U.S. Pat. No. 4,486,741 to Nozawa et al.

U.S. Pat. No. 4,500,751 to Darland et al.

U.S. Pat. No. 4,532,378 to Yasunoba Nakayama, et al.

U.S. Pat. No. 4,585,908 to Louis Smith.

U.S. Pat. No. 4,608,457 to Fowler et al.

U.S. Pat. No. 4,649,563 to Risken.

U.S. Pat. No. 4,650,927 to Leland James.

U.S. Pat. No. 4,658,417 to Hashimoto et al.

U.S. Pat. No. 4,674,112 to George Kondraske, et al.

U.S. Pat. No. 4,677,659 to Dargan.

U.S. Pat. No. 4,680,278 to Davis, II et al.

U.S. Pat. No. 4,724,423 to Kinoshita.

U.S. Pat. No. 4,737,980 to William Curtin, et al.
U.S. Pat. No. 4,799,254 to Dayton et al.
U.S. Pat. No. 4,817,129 to Risken.
U.S. Pat. No. 4,825,464 to Wen.
U.S. Pat. No. 4,860,234 to Lapeyre.
U.S. Pat. No. 4,891,777 to Lapeyre.
U.S. Pat. No. 4,910,697 to Lapeyre.
U.S. Pat. No. 4,918,721 to Kazuo Hashimoto.
U.S. Pat. No. 4,924,431 to Lapeyre.
U.S. Pat. No. 4,988,997 to Prame.
U.S. Pat. No. 4,999,795 to Lapeyre.
U.S. Pat. No. 5,007,008 to Beers.
U.S. Pat. No. 5,031,119 to Dulaney et al.
U.S. Pat. No. 5,062,070 to Lapeyre.
U.S. Pat. No. 5,067,103 to Lapeyre.
U.S. Pat. No. 5,105,375 to Lapeyre.
U.S. Pat. No. 5,117,455 to Danish.
U.S. Pat. No. 5,124,940 to Lapeyre.
U.S. Pat. No. 5,163,084 to Kim et al.
U.S. Pat. No. 5,184,315 to Lapeyre.
U.S. Pat. No. 5,274,693 to Waldman.
U.S. Pat. No. 5,303,288 to Duffy et al.
U.S. Pat. No. 5,339,358 to Danish et al.
U.S. Pat. No. 5,392,338 to Adel Danish, et al.
U.S. Pat. No. 5,486,823 to Tsai.
U.S. Pat. No. 5,548,634 to Gahang et al.
U.S. Pat. No. 5,559,512 to Jasinski et al.
U.S. Pat. No. 5,581,593 to Engelke et al.
U.S. Pat. No. 6,043,761 to Burrell, IV.
U.S. Pat. No. 6,184,803 to Burrell, IV.
U.S. Pat. No. 6,232,892 to Burrell, IV.

U.S. Pat. No. 3,675,513 to James Flanagan, et al. discloses a communication system for exchanging alphanumeric information. Flanagan produces numbers in the standard number mode by single key actuations. Actuating the * three times enters an alphabetic mode. In the alphabetic mode, the numbered alphabet key is actuated: once for the first left data character followed by the middle 0 key, twice for the second middle data character followed by the middle 0 key or three times for the third right data character followed by middle 0 key. The Q, Z and period . are located on the 1 key. The Q is produced by actuating the 1 key, followed by the actuation of the 0 key. The Z is produced by actuating the 1 key twice, followed by the actuation of the 0 key. The period . is produced by actuating the 1 key three times, followed by the actuation of the 0 key. The apparatus exits the alphabetic mode and re-enters the numeric mode by actuating the # key three times. The space is produced by actuating the # key followed by the 0 key. The enter/return function is produced by actuating the * key followed by the 0 key.

U.S. Pat. No. 3,967,273] to Knowlton does not use a standard phone keypad arrangement. Up to nine possible data characters are produced by one binary key. Letter and numbers are arranged on the sideways phone keypad corresponding to the arrangement of a standard QWERTY keyboard layout. Knowlton uses a four key binary keyboard combined with a nine key binary keyboard to produce numbers. A second four key binary keyboard combined with a nine key binary keyboard to produce the twenty-six letters of the alphabet and three symbols. A seven key binary keyboard combined with a nine key binary keyboard to produce symbols and functions. One key dedicated for a space and one key dedicated for a backspace.

U.S. Pat. No. 4,012,599 to Jerome Meyer discloses a communicator and encoding scheme. Meyer produces numbers by successively depressing the # key three times to enter a number mode followed by the single key actuations of the desired number keys. Actuation of the * key re-enters the alphabet mode. Meyer uses a three key binary keyboard (labeled * 0 and #) combined with a nine key binary control keyboard (numbered: 1, 2, 3, 4, 5, 6, 7, 8 and 9) to produce twenty-six letters of an alphabet excluding a space. The period, Q and Z are located on the one key. The period is produced by actuating the * key, followed by the actuation of the 1 key. The Q is produced by actuating the 0 key, followed by the actuation of the 1 key. The Z is produced by actuating the # key, followed by the actuation of the 1 key. A space is produced by pausing after entering a word by inserting a period or by flashing the last letter through multiple actuations of the alphabetic key. Actuation of the * key three times exits the alphabet mode and enters a symbol mode. Moving from the number mode to the symbol mode requires actuation of the * key four times. Exiting the symbol mode requires actuation of the # key once.

Witten, I. H., Principles of Computer Speech produces numbers by depressing the # key twice to enter a number mode followed by the single key actuations of the desired number keys. Actuation of the * key twice enters the alphabetic mode followed by the single key actuations of the desired alphabetic data found on the numbered keys. Actuation of the # key at the end of the word ends the one key data string and sends it to be resolved by the computer. Eight percent of words are ambiguities. A nine key binary keyboard is used to produce twenty-six letters of an alphabet including a space. The space, Q and Z are located on the one key. A space is produced after entering a word or by actuation of the 1 key. Actuation of the * key once followed by the actuation of the zero 0 key exits the alphabet mode and enters a symbol mode with three possible symbols on each key. In a dictionary of 24,500 words, just under 200 ambiguities (8% of words) were discovered.

U.S. Pat. No. 4,585,908 to Louis Smith discloses a data entry and display circuit. Smith produces numbers by successively depressing the desired numbered key two times. Smith uses a nine key binary keyboard combined with a three key binary keyboard to produce twenty-six letters of the alphabet excluding a space. Numbers require double actuation of the numeric key to produce a number. An unused data character labeled as a (blank) is positioned between the Q and Z on the one key. The Q is produced by actuating the 1 key, followed by the actuation of the # key. The unfilled data position between the Q and Z, referred to as (blank), is not used for anything. The Z is produced by actuating the 1 key, followed by the actuation of the # key. A space is produced by successively depressing the # key followed by the 0 key. The backspace is produced by successively depressing the * key followed by the 0 key. The insertion of a character is produced by successively depressing the 0 key followed by the * key. The deletion of a character is produced by successively depressing the 0 key followed by the # key. The tab function is produced by successively depressing the * key followed by the # key. The return/enter function is produced by successively depressing the # key followed by the * key. Each data entry requires two successive actuations to produce numbers or letters. Smith claims a circuit requiring an actuation of a key for an unspecified predetermined duration, along with a second key actuation, with a second unspecified predetermined duration of actuation. Actuation of the * key does not exit a one key number mode and enter a two key alphabetic mode in and does not allow for any punctuation.

U.S. Pat. No. 4,608,457 to Fowler et al. produces numbers using two key combinations by actuating the desired number key followed by the # key. Fowler uses a 10 key binary keyboard combined with a one key binary keyboard for numbers; a 9 key binary keyboard (numbered: 2, 3, 4, 5, 6, 7, 8, 9 and 0) combined with a three key binary keyboard (numbered: 1, 2 and 3) to produce letters of the alphabet: where the Q and Z are located on the middle 0 key; and a 10 key binary keyboard (numbered 1, 2, 3, 4, 5, 6, 7, 8, 9 and 0) combined with a one key binary keyboard (numbered: 4) to produce symbols, which includes a space and a double space; and a 12 key binary keyboard combined with a 1 key binary keyboard (numbered: 0) to produce 12 words and expressions. The device uses two key combinations to produce numbers, letters, symbols and words or expressions.

U.S. Pat. No. 4,918,721 to Kazuo Hashimoto discloses a phone capable of producing upper-case and lower-case letters. Hashimoto produces numbers in the standard number mode by single key actuations. Hashimoto uses as a one key binary keyboard (labeled #) actuated one time for the left data character, two times for the middle data character or three times for the right data character combined with an eleven key binary keyboard (numbered 1, 2, 3, 4, 5, 6, 7, 8, 9, 0 and *) to produce one of twenty-six lower case letters or a space on keys 1 through 9 and produces a comma and a period on the 0 key. Actuating the * key after entering one of twenty-six letters produces an upper case letter. Hashimoto also uses a 10 key binary keyboard (numbered 1, 2, 3, 4, 5, 6, 7, 8, 9 and 0) combined with a two key binary keyboard (labeled * and #) to produce numbers, letters and a space. Hashimoto positions from left to right; the Q, Z and space on the number 1 key. Two methods of data entry are disclosed. In the first, the Q is produced by actuating the # key, followed by the actuation the 1 key. The Z is produced by actuating the # key twice, followed by the actuation of the 1 key. The space is produced by actuating the # key three times, followed by the actuation of the 1 key. In the second method of data entry, the Q is produced by actuating the 1 key twice, followed by the actuation of the # key. The q is produced by actuating the 1 key twice, followed by the actuation of the * key. The Z is produced by actuating the 1 key three times, followed by the actuation of the # key. The z is produced by actuating the 1 key three times, followed by the actuation of the * key. The space is produced by actuating the 1 key four times, followed by the actuation of the # key. The left data character is produced by actuating the desired number key twice followed by the * key for a lower-case letter of the # key for an upper case letter. The middle data character is produced by actuating the desired number key three times followed by the * key for a lower-case letter or the # key for an upper case letter. The right data character is produced by actuating the desired number key four times followed by the * key for a lower-case letter of the # key for an upper case letter. The space is produced by actuating the 1 key four times followed by actuating the # key. The backspace is produced by actuating the # key three times followed by actuating the * key. The enter/return key is produced by actuating the # key twice followed by actuating the * key.

U.S. Pat. No. 4,427,848 to Peter Tsakanikas discloses an alphanumeric data transmission system. Tsakanikas positions from left to right; the Q, Z and hyphen—on the 1 key, although there is no coding scheme to layout to figure out actuation combinations for data representation. Single actuation is used for the left data position, double actuation is used for the middle data position and triple actuation is used for the right data position to produce the desired alphabetic data.

U.S. Pat. No. 4,440,977 to John Pao, et al. discloses a sequential twelve key apparatus. Pao positions from left to right; the period ., Q and Z on the 1 key. The period . is produced by actuating the 1 key, followed by the actuation of the * key. The Q is produced by actuating the 1 key, followed by the actuation of the 0 key. The Z is produced by actuating the 1 key, followed by the actuation of the # key.

U.S. Pat. No. 4,532,378 to Yasunoba Nakayama, et al. discloses a telephone apparatus for alphanumeric data entry. Nakayama positions from left to right; the Q, Z and period . on the 1 key. Single key actuation for the left data position, double actuation for the middle data position and triple actuation for the right data position, followed by the actuation of the 0 key, to produce the desired alphabetic data.

U.S. Pat. No. 4,650,927 to Leland James discloses a processor-assisted system for communicating using a telephone. James positions from left to right; the Q and Z on the 1 key. The Q is produced by actuating the 1 key. The Z is produced by actuating the 1 key. When the alphabetic word is completed, the user actuates the * key as a space, which sends the alphabetic data word to a computer to decipher what the word is.

U.S. Pat. No. 4,674,112 to George Kondraske, et al. discloses a communication apparatus including a method of use. Kondraske positions from left to right; the Q, Z and apostrophe ' on the 1 key. The Q is produced by actuating the 1 key. The Z is produced by actuating the 1 key. When the alphabetic word is completed, the user actuates the * key as a space, which sends the alphabetic data word to a computer to decipher what the word is.

U.S. Pat. No. 4,737,980 to William Curtin, et al. discloses a method and apparatus for inputting data into a computer. Curtin positions from left to right; the Q, Z and a box(?) on the 1 key. Three alphabetic letters and the number on the key face are all represented by the same key actuation. A predetermined probability algorithm guesses what type of data the user entered into the phone/computer terminal.

U.S. Pat. No. 5,392,338 to Adel Danish, et al. discloses a method for entering alphabetic characters into a telephone apparatus. Danish et al. represents from left to right; the Q and Z on the 1 key. The Q is produced by actuating the 1 key. The Z is produced by actuating the 1 key twice. Numbers must be entered individually, followed by the activation of the # key.

U.S. Pat. Nos. 3,647,973 to James et al., 4,005,388 to Morley et al., 4,007,443 to Bromberg et al., 4,191,854 to Coles, 4,307,266 to Messina, 4,426,555 to Underkoffler, 4,608,457 to Fowler et al., 4,825,464 to Wen, are additional prior art patents where the Q and Z are represented or located on the 0 key.

U.S. Pat. Nos. 3,526,892 to Bartlett et al., 3,573,376 to Bartlett et al., 3,618,038 to Stein, 3,746,793 to Sachs, 3,833,765 to Hillborn et al., 3,870,821 to Steury, 3,879,722 to Knowlton, 3,967,273 to Knowlton, 4,304,968 to Klausner et al., 4,344,069 to Prame, 4,381,502 to Prame, 4,500,751 to Darland et al., 4,649,563 to Risken, 4,658,417 to Hashimoto et al., 4,677,659 to Dargan, 4,817,129 to Risken, 4,988,997 to Prame, 5,117,455 to Danish, 5,163,084 to Kim et al., 5,303,288 to Duffy et al., 5,339,358 to Danish et al., 5,486,823 to Tsai, 5,548,634 to Gahang et al., 5,559,512 to Jasinski et al., U.S. Pat. No. 6,043,761 to Burrell, IV, U.S. Pat. No. 6,184,803 B1 to Burrell, IV and U.S. Pat. No. 6,232,892 to Burrell, IV disclose prior art patents that use the phone keypad to enter alphanumeric data.

U.S. Pat. Nos. 2,073,333 to Chireix, 3,381,276 to James, 3,582,554 to LeBlang, 3,778,553 to Rackman, 4,481,508 to Kamei et al., 4,486,741 to Nozawa et al., 4,680,278 to Davis, II et al., 4,724,423 to Kinoshita, 4,799,254 to Dayton et al., 4,860,234 to Lapeyre, 4,891,777 to Lapeyre, 4,910,697 to Lapeyre, 4,924,431 to Lapeyre, 4,999,795 to Lapeyre, 5,007,008 to Beers, 5,031,119 to Dulaney et al., 5,062,070 to Lapeyre, 5,067,103 to Lapeyre, 5,105,375 to Lapeyre, 5,124,940 to Lapeyre, 5,184,315 to Lapeyre, 5,274,693 to Waldman, 5,581,593 to Engelke et al., disclose other prior art patents.

The military used the A, B, C and D digits for special purposes, but that never carried over into the commercial or public world probably because of the thousands of central offices from various manufactures that would have to modify their equipment extensively. Digital PBXs and Keysets never used ABCD tones but rather used out of band digital signals between instruments using other keys. Some special purpose business handheld radios and electronic test sets have the ABCD keys. The PSTN has remained the same for dialing purposes, but has used other signaling techniques for increased speed and routing purposes. The dialing standard today still accommodates rotary 10 digit dialing.

With the advent of telephones that are connected to something that is connected to the Internet, these extra 4 digits can be used as additional function keys for increased user functionality. They can dynamically change according to the state of the call.

This means that any ABCD equipped telephone that is connected to the IP world, through a gateway computer, can use ABCD as function keys and still use the same keypad to dial the old PSTN network that only requires digits 0-9 to complete a call. Said gateway computer might be a softswitch connected to the PSTN or a network such as a cellular network, or merely an Internet Access Device devise that connects analog telephones to the IP world.

U.S. Pat. No. 3,870,821 Pushbutton Telephone Printer Recorder, 1975 shows a 16 key DTMF keyboard in its drawing for representing a printer showing alphanumeric update information.

U.S. Pat. No. 3,618,038 Telephonic Data Transmission System, 1971, utilized 10 keys.

Patent Application 20040022376 Universal Interface Device Driver System, describes a device that couples to any tone generation device and connects to a telecom network. While it receives all 16 DTMF tones, it uses standard industry chip sets to do so, which is what this invention refers to. Telephone devices in the public arena do not have any keys to generate the ABCD tones.

Patent number U.S. 2004001482, Method For Sending Dual-Tone Multi-Frequency Signal Using Voice Over Internet Protocol, describes a method of the tone management.

SUMMARY OF INVENTION

Over 60+ years ago TouchTone signaling was invented and slowly introduced into the PSTN. A major conversion to tone signaling occurred in the 1970's for business and public telephones, still allowing for rotary telephones to exist. Both still only use the decimal digits to call any number in North America or the world. The electronics of the integrated circuit keypads have all 16 digits of the DTMF signaling standard built into the electronics. Only 12 signals are utilized for the 0-9 digits and * and #.

The invention describes how the addition of the 4 unused signals can benefit the caller when they access an IP network where they can launch an application or where they can be interactive with an application. It further allows for future expansion of the DTMF standards to include additional tones. More keys on telephones will not confuse the user as the standard 4×3 matrix can remain with emphasis, while extra keys can be aligned in any manner. Further extensions of the patent discuss re-labeling the alphabetic portion of the keys, possibly giving vowels their own key making it easier to use the keypad for alphanumeric signaling.

BRIEF DESCRIPTION OF FIGURES

FIG. 1—Different TouchTone keypads used in public networks.

FIG. 2—Keypad with ABCD keys

Figure 3:
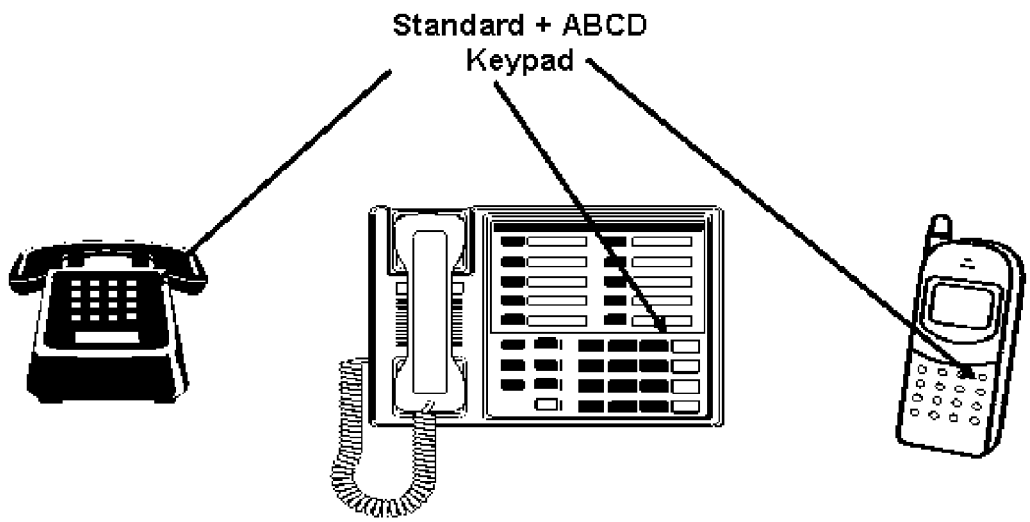
FIG. 3—Future versions of phones with the ABCD keys added

The industry typically never changes the standard 12-button matrix keypad layout which provides a user a familiar, visual anchor. Everybody knows how to use this keypad. Adding 4 buttons as another column to this matrix, maintaining the 12 in place, keeps this familiarity and doesn't overwhelm those who are intimidated with buttons and features. In fact adding a tiny physical bump or ridge to a ABCD button might improve the adaptive learning and response time effect, especially for visually impaired people. The multifunction buttons can also be used for telephone device control buttons. In fact having them in a 4×4 matrix might be a well placed location for internal usage just because they are aligned with the 12-button keypad and not in different locations as in many cellular phones.

Historically very few people know how to use many of the functions of a Keyset, a PBX, POTS or a Centrex telephone, much less a computer based softphone. Merely hunting and pushing a DTMF button to spell a name or a command on a phone is cumbersome to lots of people. Many softphones look like a walkie-talkie with small buttons and labels, just like their physical counterparts. Having the ABCD buttons in a commonly used arrangement, such as a 4×4 matrix, with these buttons having relabeling capabilities, will provide a very simple, easier to use telephone device. With the creativity of the softphone devices, there is no telling how many new options developers will come tip with.

Because the ABCD signals are new and can take on different roles than typical 0-9 character commands, existing software applications can be easily modified to utilize these signals in a more global manner without significant modifications to the mainline software logic in Voice Mail, IVR mid the like systems. A comparison can be made to an Excel spreadsheet that has been completed and then a Macro is then created to move around or perform other functions rapidly with a single letter (Ctrl-X) keyboard command. The ABCD buttons can act like a Macro command. They can also be used as integral commands and responses in new applications.

More and more homes are installing portable phone systems that eliminate wiring every room with RJ-11 telephone jacks. Every manufacturer has unique functions with the only commonality being the 12-button keypad. A 16-button keypad with some standard functions on the ABCD keys would make them more user friendly to those who are intimidated by the complexity of such simple phones.

Statistically, a very important aspect for the user is that the 4 ABCD DTMF buttons yield a 33% increase (4:12) in the quantity of buttons or a 40% increase (4:10) in the quantity of alphanumeric labeled buttons, keeping in tact the original 12-button keypad layout, at a time when the information access and retrieval on communication networks is exploding. It keeps the 12-button keypad layout in tact as a familiar visual anchor tool users recognize, and a blending of the 4 new buttons in various ways.

The following table shows the most frequently used letters in the English language. Either of these methods, by frequency of use or by vowels, provides an enhanced efficiency for text/data entry. "E" is the most frequently-used vowel in the English language, followed by "A", "O", "I" and "U". For every frequently used letter assigned to a single key, and for every key that has less than 3 letters, which is the minimum number found on every key on the standard 12-button keypad, a decrease in the amount of time and effort for text/data entry is the result.

Relative Frequencies of Letters in the English Language

| Letter | Frequency |
|---|---|
| E | 12.70% |
| T | 9.06% |
| A | 8.17% |
| O | 7.51% |
| I | 6.97% |
| N | 6.75% |
| S | 6.33% |
| H | 6.09% |
| R | 5.99% |
| D | 4.25% |
| L | 4.03% |
| C | 2.78% |
| U | 2.76% |
| M | 2.41% |
| W | 2.36% |
| F | 2.23% |
| G | 2.02% |
| Y | 1.97% |
| P | 1.93% |
| B | 1.49% |
| V | 0.98% |
| K | 0.77% |
| J | 0.15% |
| X | 0.15% |
| Q | 0.10% |
| Z | 0.07% |

Source: Wikipedia

While the following descriptions discuss how a word label on a button is much friendlier than a number label on a button, a study of any application that the telephone dials into, can determine which commands can or could be used the most. A smart telephone device can display up to 4 of those commands on the multifunctional ABCD buttons. The application at the distant end can communicate and update the multifunctional telephone device through several means, including a wireless out of band data link, or an inband signaling protocol called ADSI. ADSI does work over IP links but may require the G.711 protocol which is 64 Kbps. In the following examples of word labels on the ABCD buttons, a telephone device without the ABCD signals that accesses the same application can start at the same place in the application as the ABCD signals but will follow the legacy tree structure when the smart keypad is detected and follows a short "Macro" tree then falls back into the legacy route until the next "Macro" is encountered. The ABCD signals can provide an enhancement over the 12-button keypad signaling. Both type of keypads work, but a special handling and legible response can be derived with the enhanced ABCD signaling.

Voice Mail and IVR applications use the DTMF signaling protocol as input commands for inquiries and transactions, unless speech recognition is offered. Even then a user can generally revert back to DTMF if the recognition fails. Dialogic Inc. has been one of the largest proprietary providers of Voice Mail and IVR equipment that interfaces with both analog (loop start, ground start, FXS, FXO, 2/4 wire E&M, etc.) and digital (T-1, BRI/PRI ISDN) lines. VoiceXML is the latest technology for replacing the proprietary hardware systems. Both offer ADSI protocol interfaces and both can interface with out of band signaling.

In FIG. 2, different labels on the ABCD DTMF buttons are depicted as "Mail", "Fax", "Login", "Back" to control the options of voice mail, IVR or other applications. If the 16-digit keypad has an alphabetic relabeling, as shown in FIG. 2 (Future Assigned Function Keys Re-labeled Alphabet), with the vowels having their own button and limiting any button to two letters, an easier to use keypad is the result.

An example of utilizing a word label on a subscriber's telephone device is accessing a system with Email and FAX Mail options. The "Mail" button can send one of the ABCD DTMF signals and be received by a stand alone system or converted to an IP signal and sent to the network application. After the answer and during or after the greeting, depressing "Mail" can instruct the application to switch to an email Text-to-Speech mode, bypassing the usual voice instructions, where the email text is converted to speech and played to the subscriber. A "Bypass" or "Skip" or "Play" label are other options for that type of application.

Similarly a subscriber could depress a button labeled "Speak" when connected to a stand alone or IP based Speech delivery system, and immediately dictate a message to be convened to text, or recorded using a Speech-to-Text or a Speech to wave or mp3 protocol, bypassing explanatory instructions. "Send" or "Review" might be other labels for this application.

Likewise, an ABCD "Mail" button can be depressed when connected to a Voice Mail application which bypasses the slow announcements, expediting the retrieval of Voice Mail. In any of these examples, depressing "Mail" again can take the user back to the start position. While any DTMF button could perform this function, having a separate key labeled as "Mail", "Bypass", "Go" etc., provides a better, clearly defined instruction or mode of operation for the subscriber, and is particularly superior to using a small wireless instrument where one doesn't have to focus on finding a number or alpha character, especially while driving or in the bright sunlight. The ABCD buttons can be in a familiar arrangement where by touch and not sight, they are readily depressed which improves the ease of use for the subscriber. In a softphone arrangement, the eye-mouse (for computers) or eye-hand (for touch screens) movement will also be quicker.

Many subscribers today have great difficulty in listening to instructions from an IVR system, for example, and following them to retrieve, backup, change, replay, save, delete or create their personal announcements or messages, etc. The multifunction "Mail" button could also have a stored telephone number to dial, acting as a speed number, followed by one of the ABCD tones, to route to and select quickly the desired application. For instance, to call your voice mail system either from a wireless telephone device or a home telephone device, depressing the "Mail" button which might be the default label for a button, can dial the stored number 214-NXX-XXXX followed by a pause to allow for ringing and answer detection, then automatically dialing one of the ABCD tones which expedites the mail retrieval process. A "Saved" button can skip to saved messages. "Scan" could skip to a quick scanning mode. "Send" or "Fwd" could send a message to another party.

A "Fax" button may send its DTMF signal and be interpreted at the distant end to switch to a Fax Text-to-Speech mode. It could also be the start of Faxing a selected document to a destination. The "Login" button may send its DTMF signal and be interpreted at the distant end to cause a switch to an application where an interactive voice response unit requests a password without having to listen to introductory "welcome" messages.

Another example of the "Login" label usage on a ABCD button is that it could represent logging in directly on a website or an IVR site, whereas a login arrival of a telephone device without the ABCD tones would have to encounter the normal, slower selection method. Websites can have multiple URLs pointing to the same location and multiple telephone numbers pointing to the same location. The dialed number for an ABCD device can select a line that is programmed to expedite the service for the user, whereas non ABCD devices experience other, slower responses.

A "Login" site may also be one that requests a device ID, akin to automatic number identification (ANI), that may be stored in an ABCD button's memory for such a purpose. An application could promote a higher degree of security login process if multiple tones were stored in an ABCD button multifunction memory, via a process that was a condition to being a member of the site. For instance, today, upon dialing a credit card customer service number, you always to have to dial the lengthy ID number. A smart phone, recognizing that that particular number was dialed, could store the ID number in an ABCD button labeled "Login". It could also receive a request from the site and retrieve it. When depressed, the DTMF digits are sent to the IVR for verification. If it is not recognized, depressing it again retransmits the information.

ABCD tone usage can add a higher degree of login security. Pass codes have typically been broken with repetitive trials of birthdays, anniversaries, other dates or personal numbers, or numbers with a known algorithmic calculation such as credit card numbers. Combining an "A" or "B" or "C" or "D" increases the security of passwords.

There will still be simple DTMF telephones and devices used on the PSTN for many years to come, probably for home, small business, payphone, and public phone usage. These devices can be allowed to access a URL website on an interactive basis where the DTMF buttons can control the site and become a limited input keyboard as today. Sites that allow for a telephone device interaction, will have verbal responses to DTMF commands. Having the 4 extra DTMF multifunction buttons improves the ease of use in these cases with more options.

The "Back" labeled button can be utilized when connected to a URL website and the user desires to go back to the previous page or subject. On IVR systems, some of the logic trees that give instructions to the caller, are complicated and lengthy. The "Back" button can simplify theses instructions rather than remembering a number previously announced along with multiple other number options. Because the multifunction buttons can be interactive with an application, successive requests or prompts from the application now allow the 16-button ABCD keypad to act as a data entry terminal as well as a telephone.

In a softphone, such as Skype or iPhone, which only uses a 12-button keypad, the multifunction ABCD buttons can be modified according to the state of the call. If after completing a call over the PSTN from a softphone, a Conference button "Conf" can be depressed using one of the ABCD buttons, a label can be changed to "PIN", where a stored PIN number associated with the dialed number will be auto-dialed upon depressing the button. Another button might be labeled "Conf Op" for Conference Operator, which when depressed, requests an operator. Another button might be labeled "Add" or "3-Way" to add another party to the conference. While some softphones have conferencing capabilities, they have typically followed the procedures found on business electronic phones where every manufacturer has a different process. The ABCD buttons can create functional standards that are easy to use and remember.

On a softphone, arranging the ABCD buttons in a layout with labels of four directional arrows would also allow the emulation of the four arrow keys of a computer keyboard. With games being a major download revenue source to wireless devices, an arrangement of this sort allows the user to play a game with more versatility using the multifunction ABCD buttons to control the game.

While the quantity of 10-digit PSTN telephone numbers is 50-60% utilized in America, if more and more URL websites are given a telephone number or some other new application grows rapidly and requires a number, there is a possibility that the nation will run out of 10-digit numbers. Then the addition of an "A", "B", "C", "D" DTMF character as part of the telephone number would alleviate this problem.

Implementing a 16-button keypad with all of the DTMF tones, a "word" command label is a vast improvement over using numbers or trying to find the letter of a name, a command or response on the 12-button keypad. Having multifunctional buttons increases the uniqueness and flexibility of this enhanced telephone device. Laying out a new alphabet scheme, limiting the number of letters on a button and having a button for each vowel, also is an enhancement for the telephone device user.

DETAILED DESCRIPTION

In FIG. 2, the additional keys to go from 12 to 16 DTMF tones are shown. They are depicted in a 4th column arrangement to the right of today's ubiquitous 3×4 matrix keypad, thus the origin of its nomenclature. On normal low priced telephones, a standard ABCD label may be used. On more sophisticated electronic phones including mobile phones, these keys may have variable labels as shown in FIG. 2 for functional usage depending on the application that the user is in. The last layout of FIG. 2 shows a complete example of 1) maintaining the 12 key matrix but allowing for functional labels and a total re-labeling of alphabetic characters; 2) a single key for vowels and y. Re-labeling will be a difficult task as many legacy computer programs would have to be modified much like the Y2K scenario which cost businesses tremendous amounts of time and effort. But progress demands change and possible this is one area for consideration. Possibly there will be more keys added to utilize even more DTMF tones beyond the standard 16. Various industries studies and committees will tackle this problem when entrepreneurs bring new innovative schemes before the public, promulgating sweeping changes of old customs.

FIG. 3 just displays the 4th column keys on different telephone devices.

Figure 4:
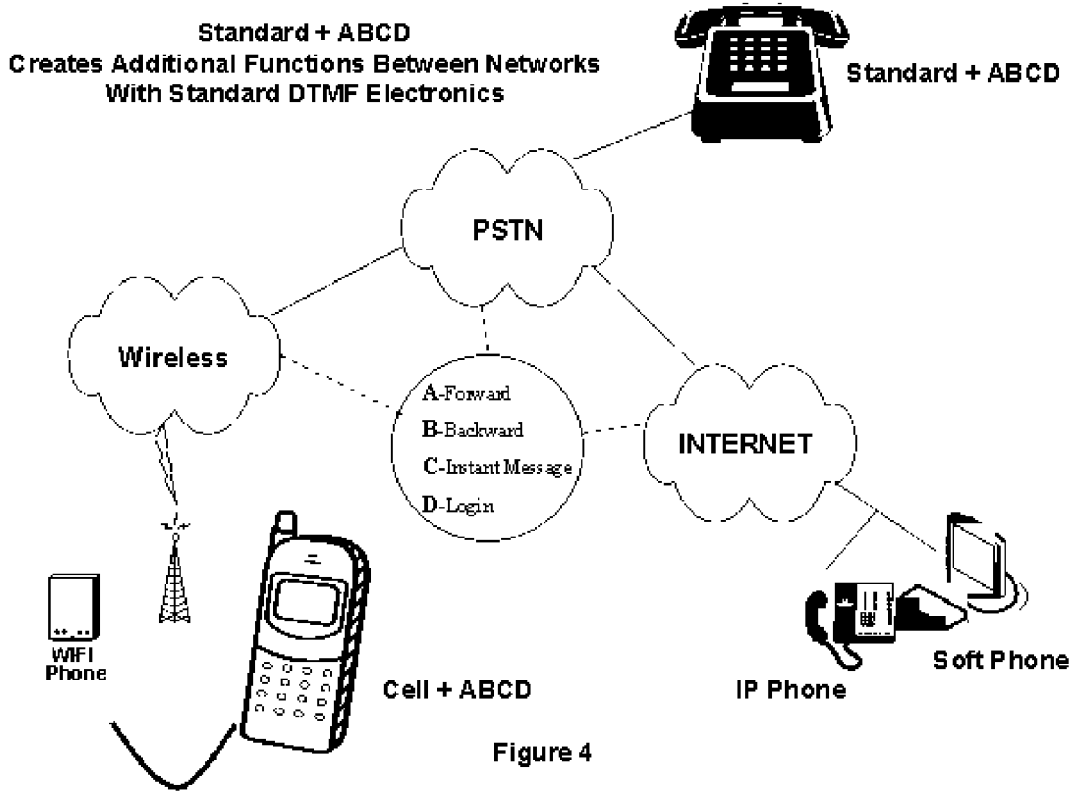
FIG. 4—Depiction of use of ABCD keys for standard adjunct features

FIG. 4 shows the interconnection of the PSTN, Wireless and the Internet. Combining all areas of information so a user can easily access them and control them from any telephone is a functionality the industry is moving towards.

Figure 5:
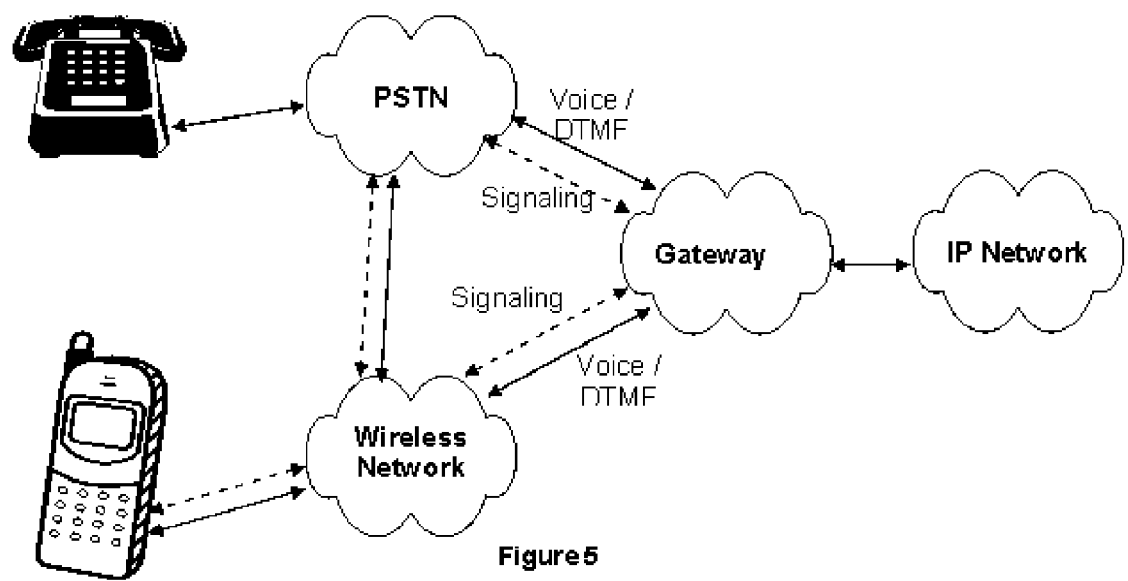
FIG. 5—Connection of Public Phone Devices connected to a gateway leading to an IP network FIG. 8—Remote Button Labeling Interaction with an IVR System Ergonomics is an important factor in providing an easy to use interface between users, telephones and computers. Many human factors are studied and tested to obtain better interfaces. Having more buttons on a DTMF telephone by itself is not a panacea. The 12-button keypad was originally designed for numeric functions only and then burdened with alphabetic over-labeling as new technology sprang up. The alpha characters are difficult to locate and remember and have for decades been a cryptic, difficult and limiting factor in a world that demands versatility and better ergonomics. On some keypads the letter is worn off. There have been no improvements in the quantity of buttons or easier relabeling since the introduction in the 1960's and 1970's. The essence of this patent increases the number of buttons by utilizing the unused portion of the DTMF domain in a multifunction way, and a method of relabeling the alphabetic characters for ease of use purposes when connected to an application on a communications network.
Figure 8:
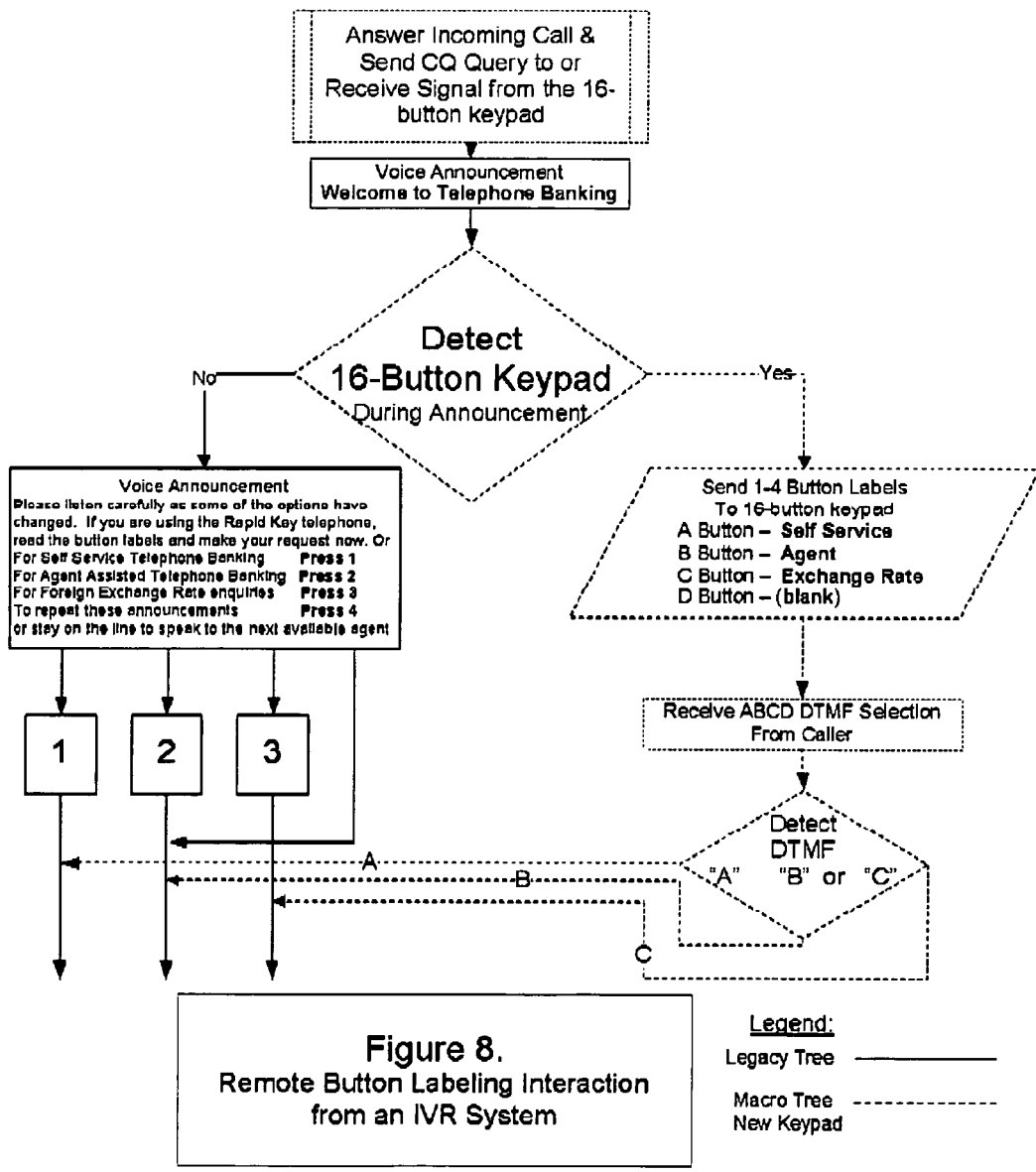

FIG. 5 shows the interconnection of these networks with the addition of the Gateway system for converting PSTN tone signals into IP formats. The Gateway may become even smarter over time and could actually be a catalyst in moving towards DTMF tones. Maybe someday the entire PSTN will be all digital and tones will be a thing of the past. But for the next several decades, the industry will have to cope with both. Businesses are rapidly moving to all digital, but the residence base of telephones is still analog, although there is rapid expansion to DSL and cable telephony. Many areas of the country do not have digital access to the home, especially in the rural communities. Thus tone dialing will continue for the time being.

Many combinations of arranging the additional keys can be made. Mobile telephones, in particular, are always arranging their keys in different manners. An expanded version for standards purposes will be appreciated by the users, as there is a high churn of the mobile phones with the extremely high functionality of the electronics and the extremely low cost of mass manufactured products continues in this arena.

The foregoing description uses preferred embodiments and processes to illustrate the present invention but is not limited to these embodiments. Modifications may be made by those skilled in the art which differ from the specific details disclosed here, but which are still within the scope of the invention.

I claim:

1. A telephone device for connecting to a subscriber communications network comprising,
   a keypad consisting of the standard 12-button keypad, 4-rows×3-columns matrix, and 4 additional button keys;
   where each button of the 16 button keypad generates a distinct tone of the 16 defined DTMF tones "1, 2, 3, 4, 5, 6, 7, 8, 9, 0, A, B, C, D";
   where the 4 additional buttons are arranged as a column in said keypad matrix and are labeled with any distinct alphanumeric character(s) or symbol and generates the; "A", "B", "C", "D" DTMF tones respectively;
   where the 4 additional button keys are multifunctional, with a means to relabel said multifunctional keys from a computer on the network;
   where each of the buttons is used to activate the telephone so that the telephone transmits a DTMF signal consisting of two tones out to the communications network;
   where the combinations of tones are those specifically defined as DTMF tone combinations for each specific dialing character;
   where the two tones correspond to said labeling on each key and to a signaling digit in a dialed telephone number or signaling character to the PSTN;
   where the telephone number consists of combinations of the characters "1, 2, 3, 4, 5, 6, 7, 8, 9, 0, A, B, C, D",
   where the six most frequently used letters of text/data entry, "e", "t", "a", "o", "i", "n", are each assigned to a key,
   where the communications network comprises a receiving device that decodes the transmitted DTMF signaling from the telephone and converts said received signaling into a network address in order to complete a phone call.

2. A method of enhanced keypad labeling of a telephone device with expanded key capacity from the conventional 12-button keypad, 4-rows×3-columns matrix, to a 16-button keypad with 4 additional button keys;
   where each button of the 16 button keypad generates a distinct tone of the 16 defined DTMF tones "1, 2, 3, 4, 5, 6, 7, 8, 9, 0, A, B, C, D";
   where the 4 additional buttons are arranged as a column in said keypad matrix and are labeled with any distinct alphanumeric character(s) or symbol and generates the "A", "B", "C", "D" DTMF tones respectively;
   where the 4 additional button keys are multifunctional, with a means to re-label said multifunctional keys from a computer on the network;
   where each of the buttons is used to activate the telephone so that the telephone transmits a DTMF signal consisting of two tones out to the communications network;
   where the combinations of tones are those specifically defined as DTMF tone combinations for each specific dialing character;
   where the two tones correspond to said labeling on each key and to a signaling digit in a dialed telephone number or signaling character to the PSTN;
   with the six most frequently used letters of text/data entry, "e", "t", "a", "o", "i", "n", are each assigned to a key;
   where the telephone device comprises a means of maintaining the standard 12 button layout and labels of 0-9, * and #.

* * * * *